United States Patent [19]

Honda et al.

[11] Patent Number: 4,999,220
[45] Date of Patent: Mar. 12, 1991

[54] METHOD FOR MANUFACTURING PERPENDICULAR MAGNETIC RECORDING MEDIUM

[75] Inventors: Kazuyoshi Honda, Takatsuki; Ryuji Sugita; Kiyokazu Tohma, both of Hirakata; Yasuihiro Kawawake, Takatsuki; Yoshiki Murakami, Osaka, all of Japan

[73] Assignee: Matsushita Electric Industrial Co., Ltd., Kadoma, Japan

[21] Appl. No.: 310,994

[22] Filed: Feb. 16, 1989

[30] Foreign Application Priority Data

Feb. 17, 1988 [JP] Japan ................... 63-34213
Nov. 17, 1988 [JP] Japan ................... 63-291155
Nov. 29, 1988 [JP] Japan ................... 63-301172

[51] Int. Cl.$^5$ ............................. H01F 10/02
[52] U.S. Cl. ............................. 427/132; 427/128; 427/251; 427/255.3; 427/255.5; 427/296; 427/316; 428/694; 428/900

[58] Field of Search ................... 427/127–132, 427/48, 251, 255.3, 255.5, 316, 296; 428/694, 900

[56] References Cited

U.S. PATENT DOCUMENTS 4,385,098 5/1983 Sugita et al. ............... 428/639 X

OTHER PUBLICATIONS

Sugita, R., et al., "Co-Cr Perpendicular Magnetic Recording Tape by Vacuum Deposition," *IEEE Transactions on Magnetics* MAG-20 (5): 687-92 (Sep. 1984).

*Primary Examiner*—Bernard Pianalto
*Attorney, Agent, or Firm*—Cushman, Darby & Cushman

[57] ABSTRACT

In manufacturing perpendicular magnetic recording medium wherein a magnetic layer containing Co and Cr as main contents on a running substrate of polymer film incident angle ($\phi_f$) of vaporized atom to form said magnetic layer is 30° or larger at the final part of the film formation to improve manufacturing capacity, and magnetic layer (119) is heated after forming the magnetic layer in an oxygen-containing atmosphere.

11 Claims, 17 Drawing Sheets (After heating)

METHOD FOR MANUFACTURING PERPENDICULAR MAGNETIC RECORDING MEDIUM

FIELD OF THE INVENTION AND RELATED ART STATEMENT

1. Field of the Invention

The present invention relates to a method for manufacturing perpendicular magnetic recording medium having splendid durability.

2. Description of the Related Art

With the development of information-leadershipped society, higher densities of recording media have been demanded. In the technology of magnetic recording, perpendicular magnetic recording systems are attracting eyes and are considered to have bright prospects, and research and development have been undertaken centering on Co-Cr. Development of Co-Cr anisotropic perpendicular magnetic film is carried out by a vacuum deposition process and a sputtering process. And especially, the process using the vacuum deposition enables high speed formation of the perpendicular magnetic recording film, and it is considered to be suitable for mass-production.

FIG. 13 shows a web coater type vacuum deposition process, whereby forming on a polymer film substrate is a perpendicular anisotropic magnetic film at such a high film running speed of several ten meters per minute or higher can be made. In such process, opening angle $\theta$ of mask 6 is preferably as large as possible for the point of productivity. There is reported that in case of fabricating Co-Cr film, when the initial incident angle $\phi_i$, which is the incident angle at the side of starting or can-entering side in the vacuum deposition chamber (which is called "initial incident angle" hereafter), is 40' or smaller, the crystal orientation of the film is not dependent on the incident angle $\phi_f$ at the side of ending of vacuum deposition (which is called "final incident angle" hereafter) (R. Sugita; "Co-Cr perpendicular magnetic recording tape by vacuum deposition", IEEE Trans. on Magn. Vol. MAG-20, No. 5, Sept. 1984)

In general, in the high density magnetic recording, the spacing or gap between the magnetic head and the magnetic recording medium must be as small as possible, and minimization of the spacing through fine-working on head and surface control technology to control the surface states of the magnetic layer and the substrate have been proposed.

On the other hand, as the spacing between the head surface and the magnetic recording medium surface is reduced, the recording medium has a severe problem of decreased durability, and trials have been made to provide a protection layer on the surface of the magnetic layer. However, since such protection layer increases spacing loss, the thickness of the protection layer must be made as small as possible.

Furthermore, there is a tendency that, when the aforementioned final incident angle $\phi_f$ of the vacuum deposition is selected large in order to obtain the large productivity of the magnetic recording film, the durability of the magnetic recording film is decreased; that is the productivity and the durability have each other antinomy relation.

OBJECT AND SUMMARY OF THE INVENTION

The present invention aims to provide an improved method for manufacturing perpendicular magnetic recording medium which has splendid properties of high durability and good magnetic characteristics for perpendicular magnetic recording medium.

The method for manufacturing magnetic recording medium in accordance with the present invention is characterized:

in a method for manufacturing perpendicular magnetic recording medium wherein a magnetic layer containing Co and Cr as main contents or Co, Cr and Ni as main contents are formed on a running substrate of polymer film, the improvement that the incident angle of vaporized atom to form said magnetic layer is 30' or larger at the side of ending of vacuum deposition and said magnetic layer is heated in an oxygen-containing atmosphere.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 (a) is a side view of a web coater type vacuum deposition apparatus for deposition of the magnetic layer.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1A:
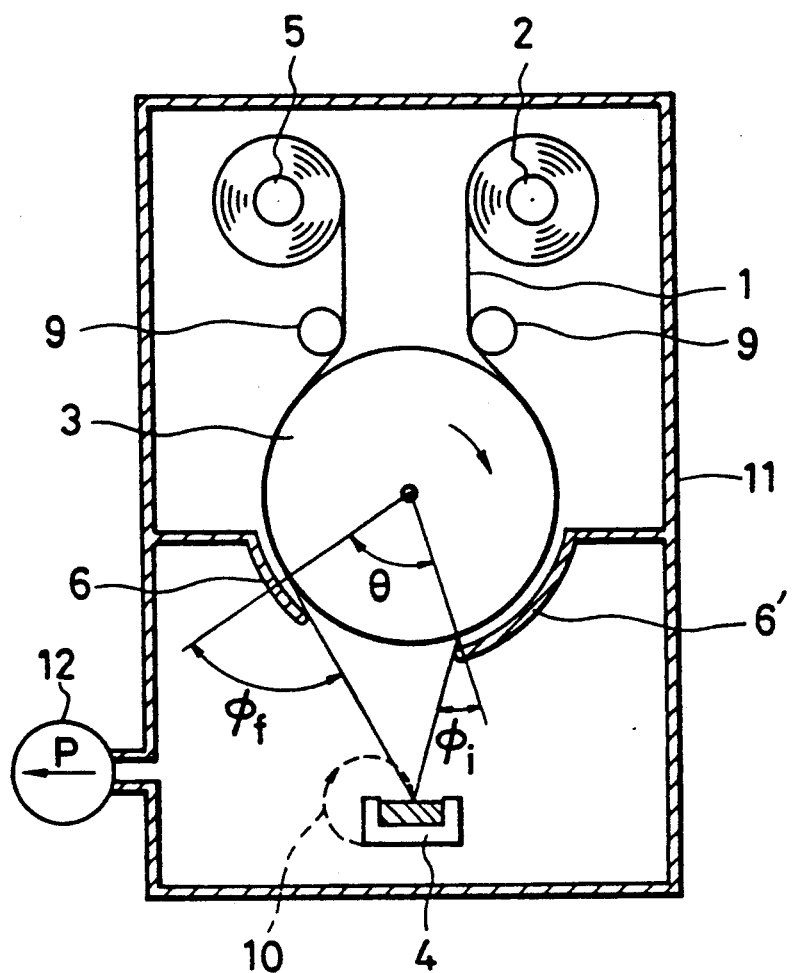
FIG. 1 (b) is a side view of a first embodiment of a heating apparatus for heating the magnetic layer of the substrate embodying the present invention.

Hereafter, preferred embodiments of the present invention are described with reference to the accompanying drawings. A Co-Cr layer is deposited on a substrate consisting of polymer film (i.e. high polymer material) by a web coater type vacuum deposition apparatus with large "mask opening width" as mentioned below as shown in FIG. 1(a). A substrate 1 consisting of polymer film rolled on a supplying reel 2 is fed out and transferred on the circumference of a cylindrical can 3, whereon Co-Cr evaporated from an electron beam 10 evaporating source 4 is deposited on the substrate 1 in transferring. And the substrate 1 is wound up by a winding reel 5. Masks 6, 6' between the substrate 1 and the evaporating source set an angle of incidence (incident angle) of vapor atoms from an initial incident angle $\phi_i$ to a final incident angle $\phi_f$.

In the above-mentioned vacuum deposition apparatus, in order to improve productivity, it is necessary to expand the width between the mask 6 and the mask 6' (which is called "mask opening width" hereafter). Namely it leads to the enlargement of the initial incident angle $\phi_i$ and/or the final incident angle $\phi_f$.

Figure 14:
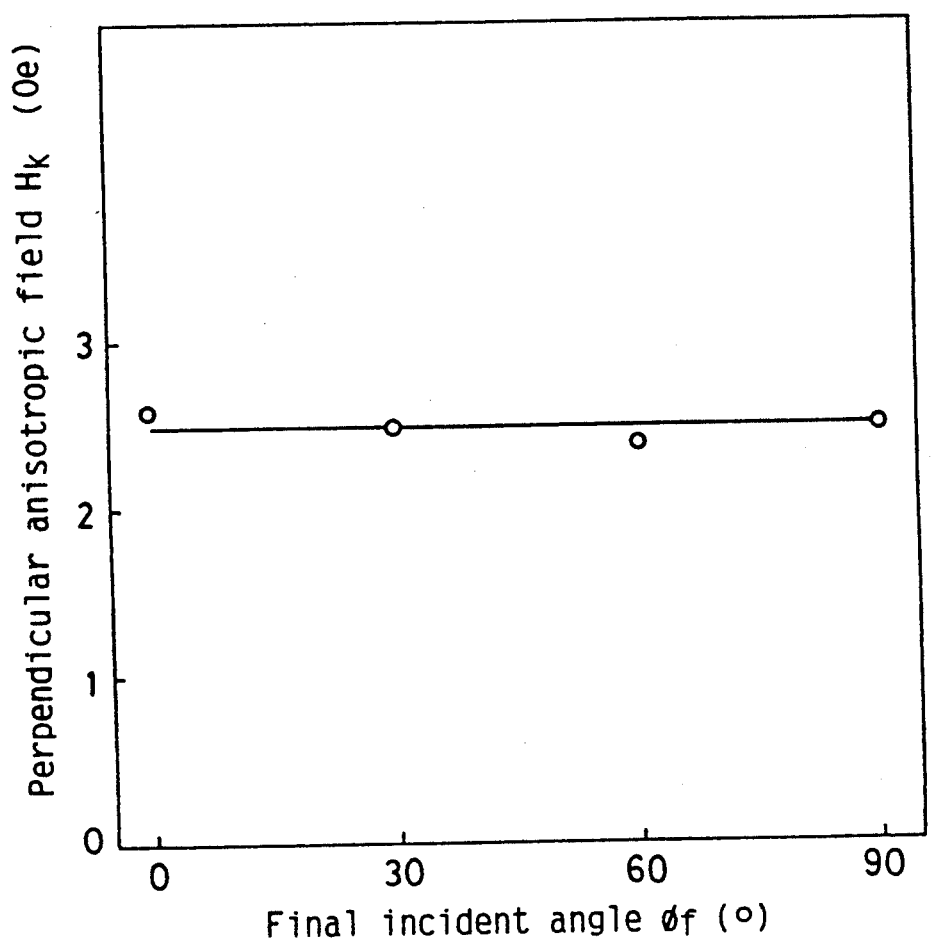
FIG. 14 is a graph showing the relation between final incident angle $\phi_f$ and perpendicular anisotropic field $H_k$ of a Co-Cr film.
Figure 15:
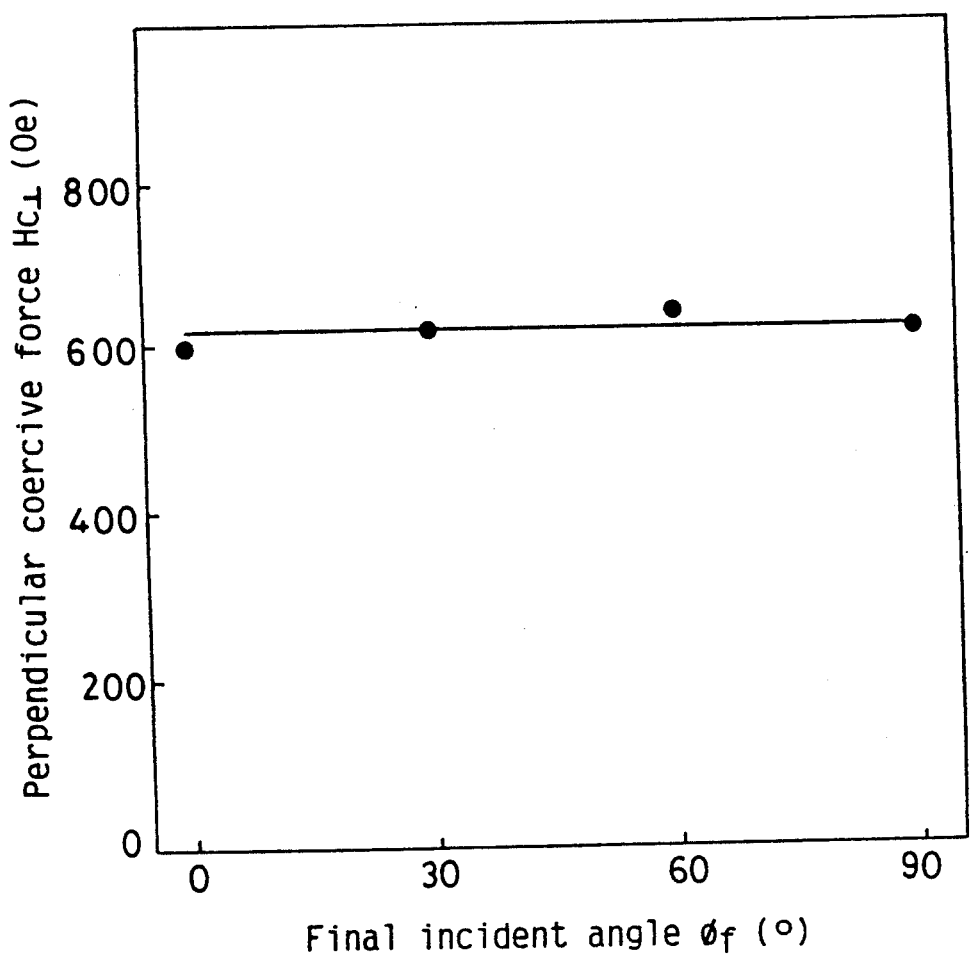
FIG. 15 is a graph showing the relation between final incident angle $\phi_f$ and perpendicular coercive force $H_{c\perp}$ of a Co-Cr film.

The above-mentioned R. Sugita shows that the crystal orientation of the Co-Cr film does not depend on the final incident angle $\phi_f$ on the condition that the initial incident angle is equal to or smaller than 40'. In compliance with R. Sugita, the main features of a perpendicular Co-Cr film such as (1) a perpendicular anisotropic magnetic field and (2) a perpendicular coercive force, are measured and shown in FIGS. 14 and 15. The Co-Cr layer of FIGS. 14 and 15 is 250 mm thick and has 500 emu/cc as saturation magnetization. FIGS. 14 and 15 show that the magnetic feature of the film shows no worse in changing to 90' of the final incident angle $\phi_f$ namely the maximum value thereof. Thus the magnetic feature of magnetic film is not affected by changing even to 90' of the final incident angle $\phi_f$.

Figure 16:
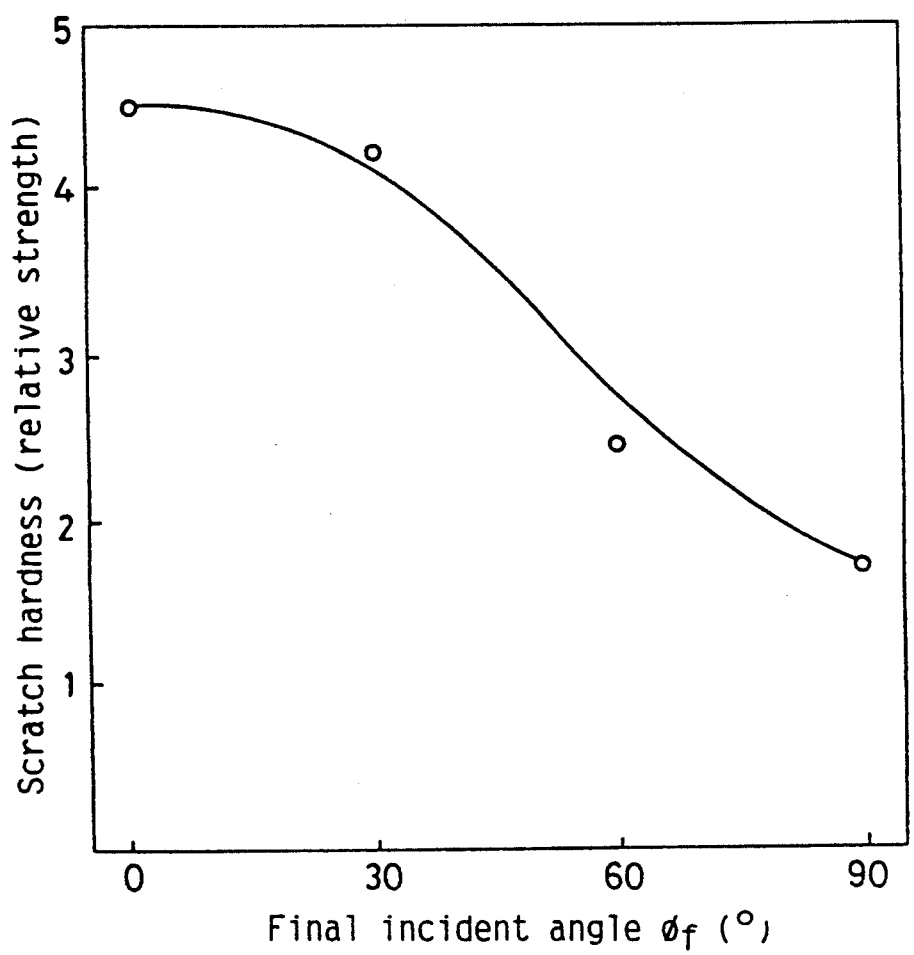
FIG. 16 is a graph showing the relation between final incident angle $\phi_f$ and scratch hardness of the Co-Cr film before the heating.

FIG. 16 shows the relation obtained between the final incident angle $\phi_f$ and the scratch hardness (strength) of the magnetic films of FIGS. 14 and 15. A steel ball is used in the scratch hardness test. FIG. 16 shows that as the final incident angle $\phi_f$ is increased, the scratch hardness (strength) of the magnetic film is decreased.

Figure 1B:
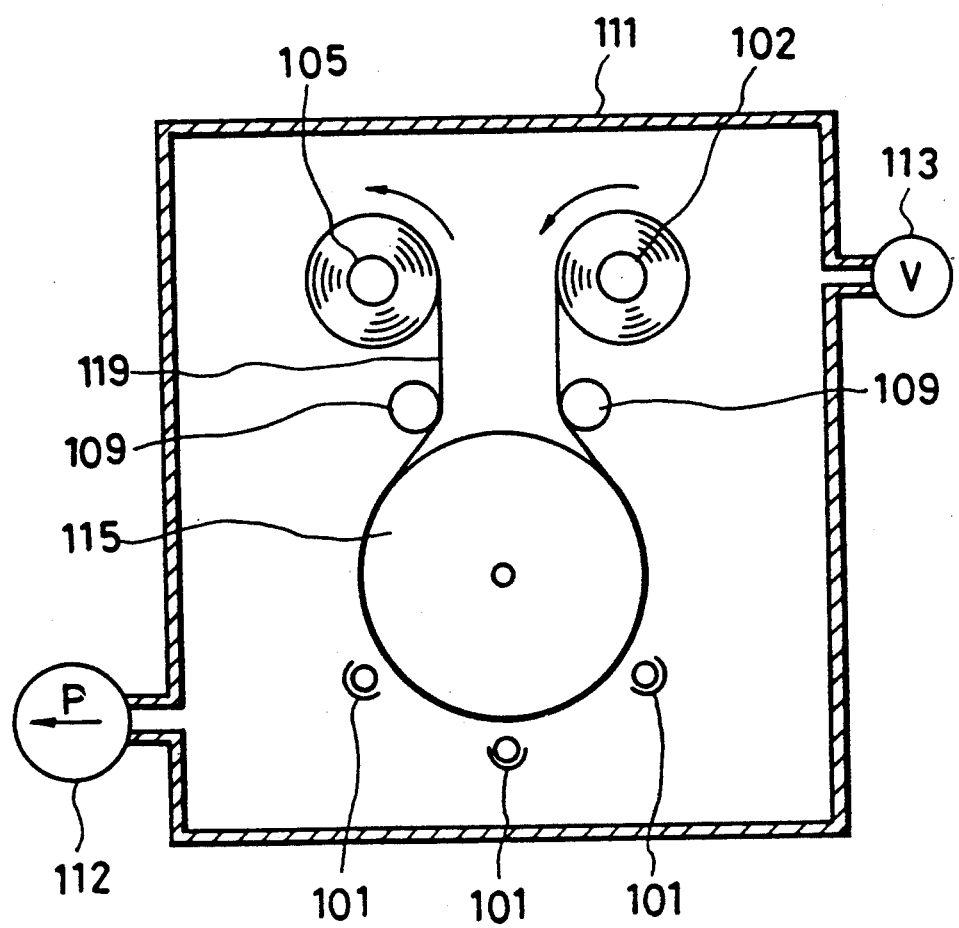

FIG. 1(b) shows an apparatus for carrying out heating treatment in a preferred embodiment of the present invention in order to obtain large scratch hardness (prevent reducing of scratch hardness) namely to obtain good durability. In FIG. 1(b) the deposited substrate 119 (the substrate 1 having Co-Cr layer formed thereon) wound on a supplying reel 102 (which corresponds to the winding reel 5 for winding deposited substrate 1 thereon in FIG. 1(a)) is fed out and transferred on the circumference of a heating cylindrical roller 115, and the deposited substrate 119 is heated by the roller 115 when the substrate is wound thereon and also by irradiation by halogen lumps 101. Any method of heating, such as either of them or other heating methods, can be chosen.

Figure 2:
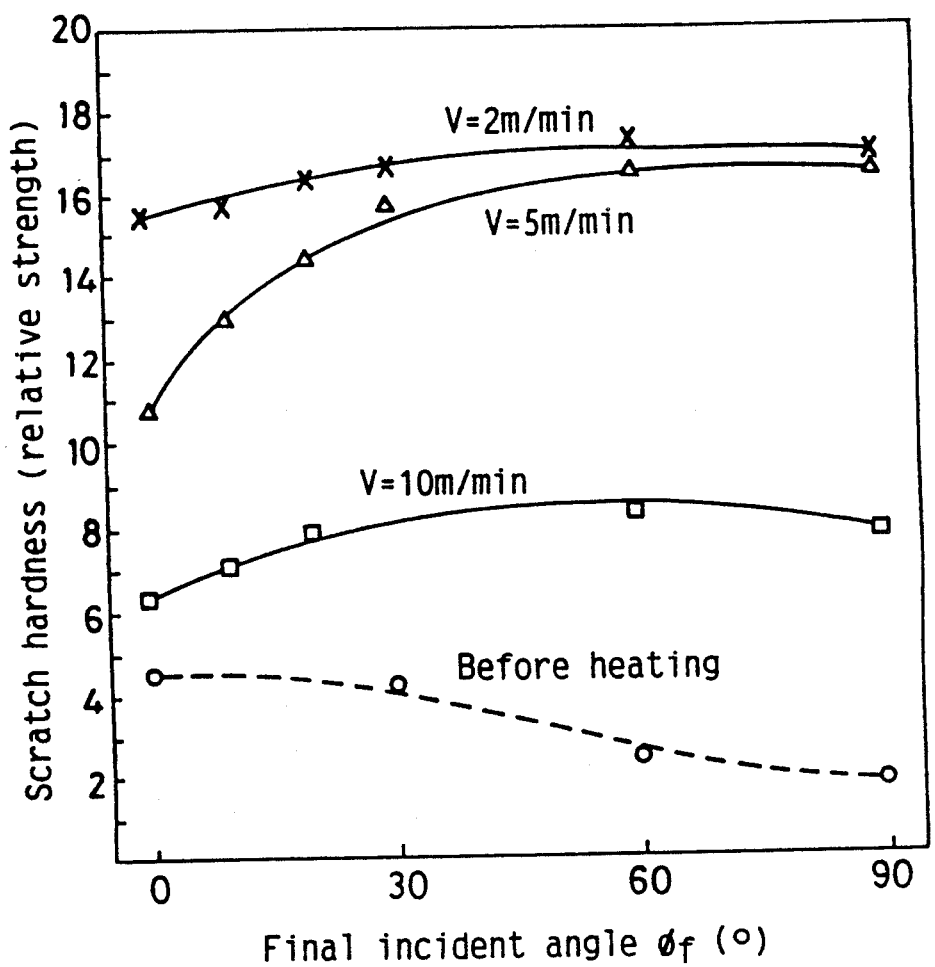
FIG. 2 is a graph showing the relation between final incident angle $\phi_f$ and scratch hardness of respective substrates of the present invention and prior art.

A result of the scratch test after the above-mentioned heating is shown in FIG. 2. The heating roller 115 of 500 mm in diameter is kept at 350° C. and the halogen lamp of 1 kw are used for heating. This heating is done in atmosphere. Lines in FIG. 2 show various heatings made with different running speeds of the substrate 119. The broken line in FIG. 2 shows the result of the scratch test before heating namely it is as same as the data shown in FIG. 16. The heating as shown in FIG. 2 proves noticeable improvement (increase) in scratch hardness namely it results in dissolution of decrease of scratch hardness under large final incident angle.

The effect of the heating is more noticeable under large final incident angle than under small one especially under high speed running of the substrate namely short heating time (period). It is considered that under a large final incident angle, packing density of Co-Cr near the film surface is smaller than the packing density under small final incident angle and results in rapid invasion of oxygen from the film surface. When the final incident angle is smaller than 30', improvement of the scratch hardness obtained by the heating becomes small due to smaller invasion of oxygen. The above-mentioned improvement of the scratch hardness caused by the heating is obtained at more than 230° C. in heating only by the heating roller.

Figure 3:
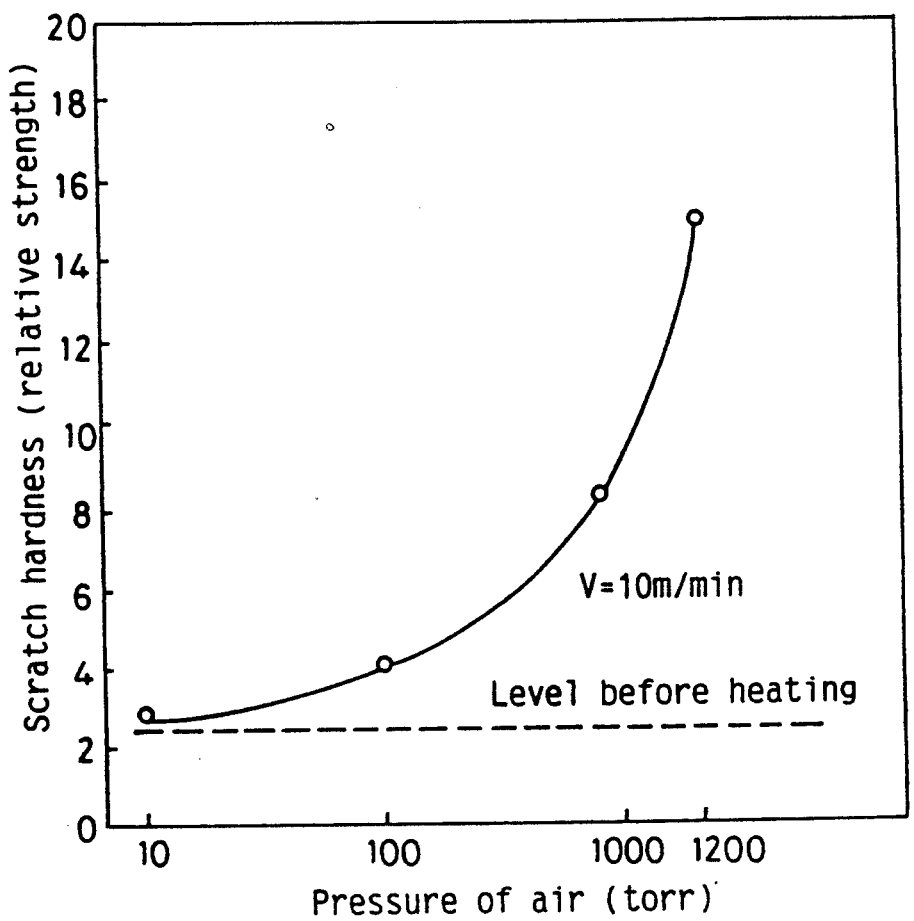
FIG. 3 is a graph showing the relation between pressure of air in the heating and scratch hardness of the substrate of the present invention.
Figure 4:
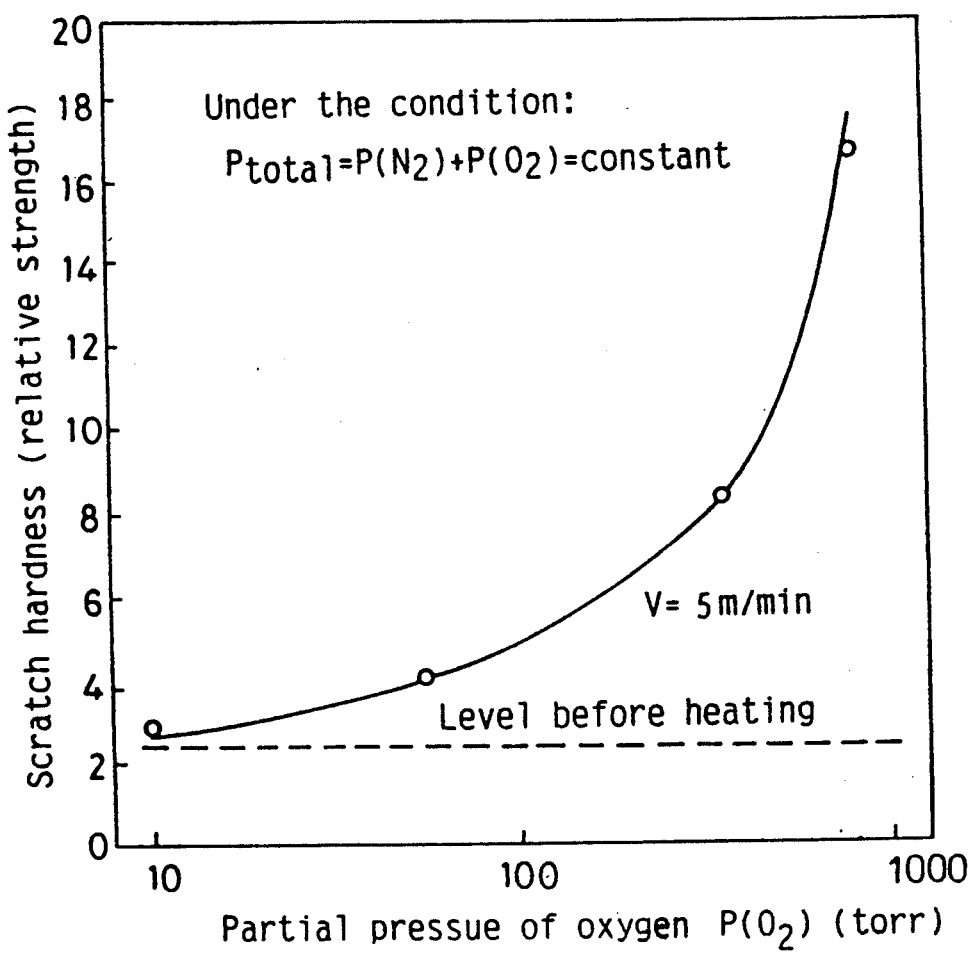
FIG. 4 is a graph showing the relation between partial pressure of oxygen in the heating and scratch hardness of the substrate of the present invention.

FIG. 3 shows data obtained under the condition that the pressure of air in heating is varied and other conditions are retained the same in the above-mentioned experiments. A conventional oil-sealed rotary vacuum pump 112 or compressor is used for realizing reduced or slightly pressurized atmosphere, respectively. In FIG. 4 the partial pressure of oxygen in heating is varied while total pressure is kept constant at 760 torr. The other conditions are the same as the cases of FIG. 2. The improvement of the scratch hardness depends on the partial pressure of oxygen in air or gas in the heating, as is shown in FIG. 3 and FIG. 4.

Figure 5:
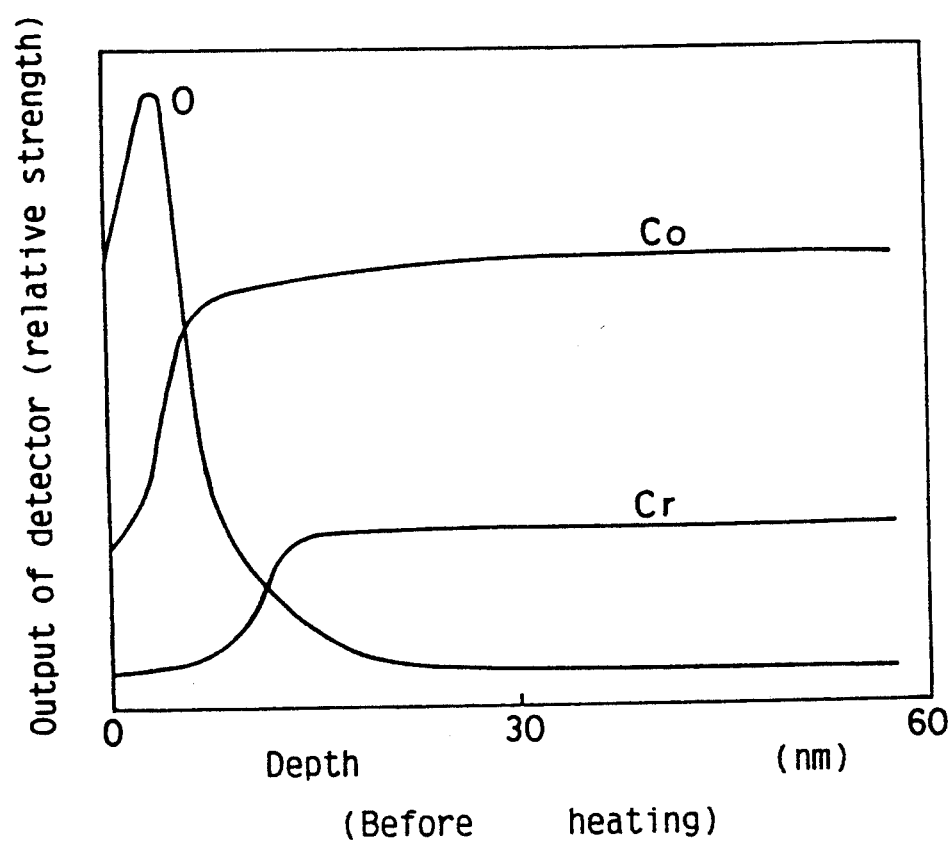
FIG. 5 is a graph showing the data obtained by the AES (Auger Electron Spectroscopy) of the Co-Cr film before the heating for obtaining O (oxygen) distribution depthwise of the Co-Cr film.
Figure 6:
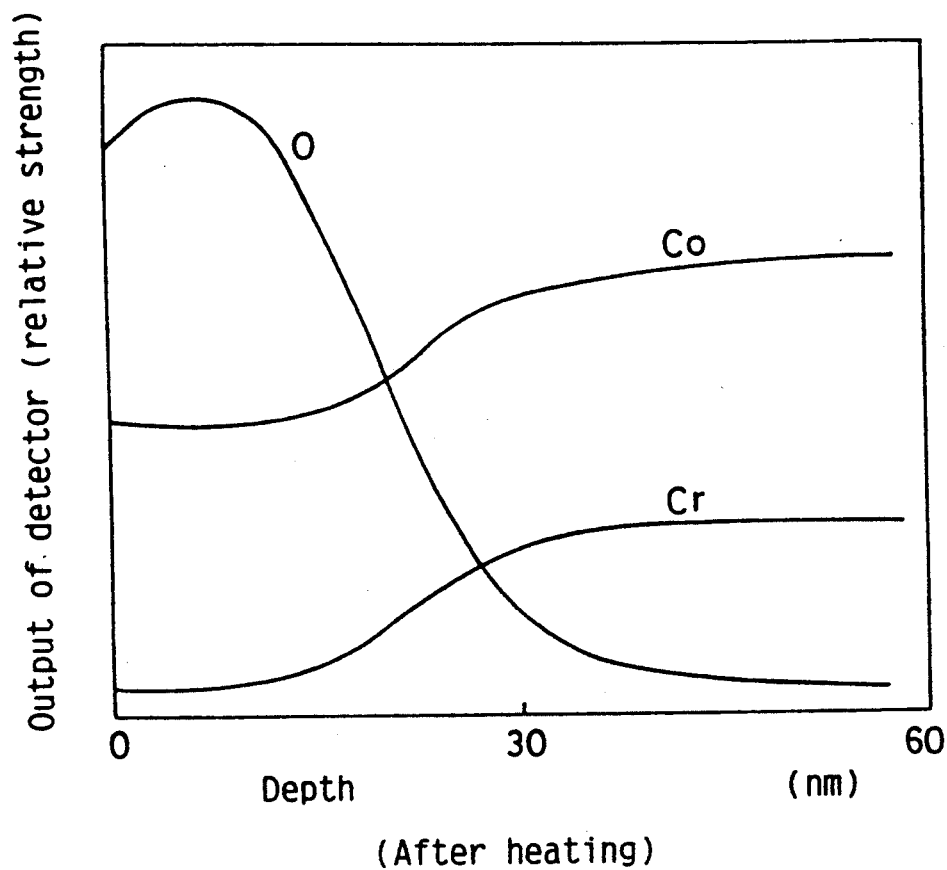
FIG. 6 is a graph showing the data obtained by the AES of the Co-Cr film after the heating for obtaining O (oxygen) distribution depthwise of the Co-Cr film.

The data obtained by the AES (Auger Electron Spectroscopy) of the Co-Cr film before the heating and after the heating are shown in FIGS. 5 and 6. The Co-Cr film deposited on the substrate is formed under 40' of both initial and final incident angles. The heating conditions are as follows: the temperature of the heating roller is 350° C., and the running speed V of the deposited film is 2 m/min. After the heating, the oxidized layer of the Co-Cr layer surface is about 7 nm thicker than that before the heating from the data shown in FIGS. 5 and 6. This oxidized layer usually leads to an undesirable increase of the spacing. The effect of the oxidized surface layer in this case is thought to be small, since decrease of reproduced voltage at 100 kFRPI (Flux Reversal Per Inch) due to the increase of spacing, 7 nm, corresponds to only about 1.5 dB.

The film formed under the condition of the large final incident angle results in low packing density at the part immediately under the film surface due to the self shadowing. Though the mechanical strength of the film before the heating is low, when the heating namely oxidation of the surface of the film is carried out, the strength against scratch is much improved. The reason is conjectured that the oxidation layer is formed rapidly through the surface of the film, and the part immediately under the film surface becomes minute and dense. Heating in ozone gives some better improving effect as that of the above-mentioned heating.

Both films the above-mentioned before and after the heating are cut to tape having 8 mm width and tested by a video tape recorder. The still durability test of the film before the heating shows scratches within a few seconds, whereas the film after the heating shows that scratch has not been observed for more than one hour in the still condition.

The heating for oxidation utilizing the heating roller occasionally makes wrinkles on the substrate at an area of getting in touch with the roller (We call this area "entrance part" hereafter) and at an area of departing from the roller (We call this area "exit" hereafter). The wrinkles seem to be due to the thermal transformation by the rapid temperature change of the substrate. As the temperature of the heating roller is higher, the wrinkles are caused more easily. The more smoothness of the subsurface of the substrate is the demand of the day for realizing higher recording density, and as the surface of the substrate is designed more smooth, the wrinkles are caused more easily.

Figure 7:
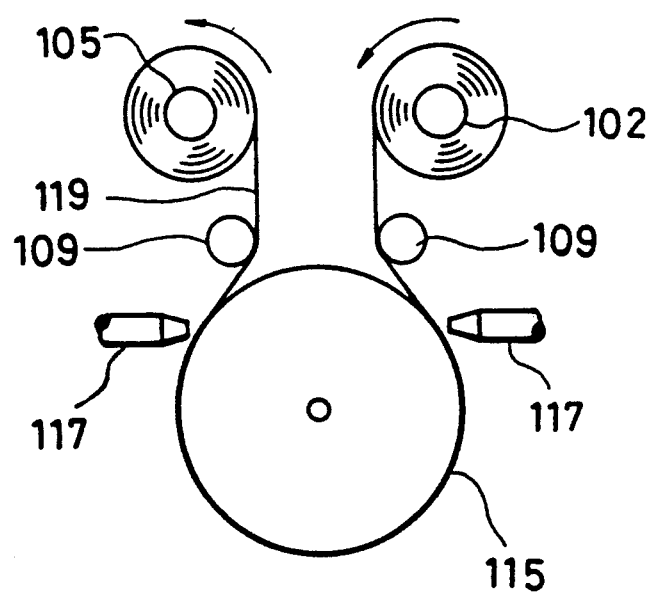
FIG. 7 is a side view of a second embodiment of a heating apparatus having cooling equipment embodying the present invention.

In order to prevent such rumpling, we find it effective that the substrate at the entrance part and at the exit part is cooled by some measure. FIG. 7 shows a heating apparatus provided with such cooling means. Corresponding parts and components to the first embodiment are shown by the same numerals and marks, and the description thereon made in the first embodiment similarly apply. Differences and features of this second embodiment from the first embodiment are as follows. The difference from FIG. 1 (b) is mounting of cooling nozzles 117 on both sides of the heating roller 115. Setting of main condition by utilizing the apparatus in FIG. 7 is as follows: the polyimide substrate has a perpendicular magnetic recording medium of 10 μm thick deposited Co-Cr film having 250nm thickness thereon, the temperature of the heating roller is 320° C., and the running speed V of the substrate is 1 m/min. Both nozzles at the entrance part side and the exit side blow cool air which is cooled by a refrigerator. When a thermo seal stuck previously on the entrance part shows the temperature of the substrate at the entrance part below 200° C., the temperature and air flow rate of the cool air is controlled, so that the wrinkle is not produced at the entrance part. Similarly, when the temperature of the substrate at the exit part is controlled below 250° C., the wrinkle is not produced at the exit part.

Figure 8:
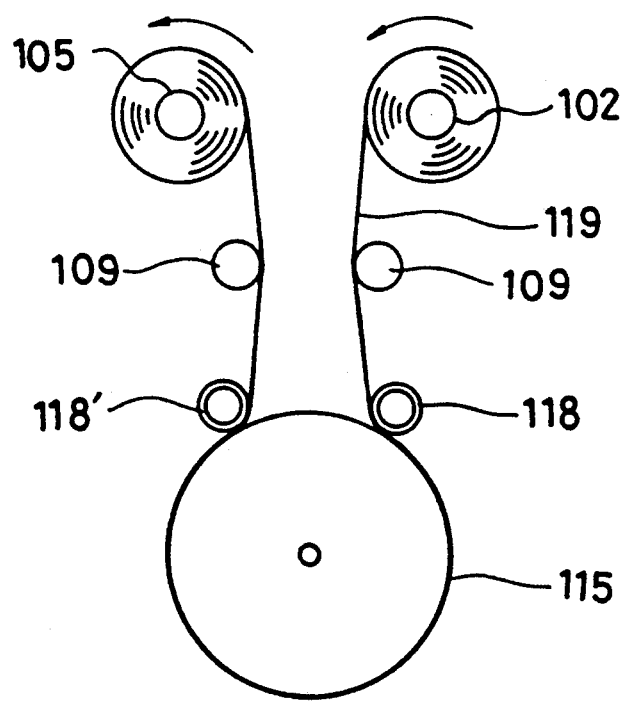
FIG. 8 is a side view of a third embodiment of a heating apparatus having cooling equipment embodying the present invention.

FIG. 8 shows an apparatus as a third embodiment utilizing another cooling method. Corresponding parts and components to the first embodiment are shown by the same numerals and marks, and the description thereon made in the first embodiment similarly apply. Differences and features of this third embodiment from the first embodiment are as follows. The difference from FIG. 1(b) is provision of nip rollers 118, 118', for cooling at both side of the heating roller 115 by contacting the roller 115 with the substrate 119 therebetween. Utilizing the apparatus in FIG. 8, setting of main condition is as follows: the polyimide substrate has a perpendicular magnetic recording medium of 10 μm thick deposited Co-Cr film having 250nm thickness thereon, the temperature of the heating roller is 320° C., and the running speed V of the substrate is 1 m/min. When the temperature of the nip roller 118 at the entrance part is higher than 200° C. the wrinkle has been observed still.

When that temperature is controlled to be less than 200° C. at the entrance part, the wrinkle is not produced at the entrance part. Similarly, when the temperature of the nip roller 118' at the exit is lower than 250° C. the wrinkle is disappeared.

Figure 9:
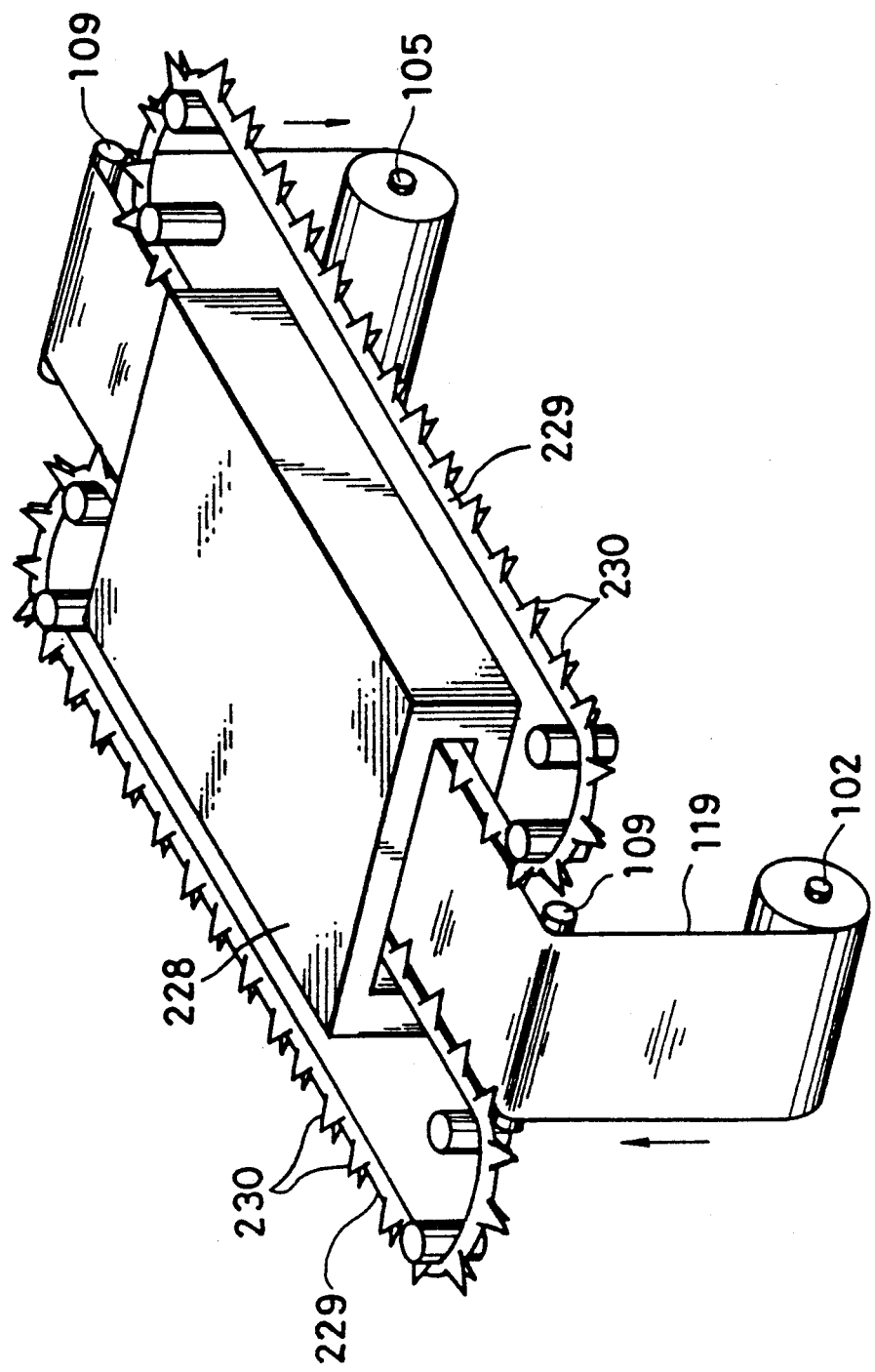
FIG. 9 is a perspective diagram of a fourth embodiment of a heating apparatus embodying the present invention.

A heating apparatus shown in FIG. 9 is usable in stead of the heating roller 115 in FIG. 1(b). Corresponding parts and components to the first embodiment are shown by the same numerals and marks, and the description thereon made in the first embodiment similarly apply. Differences and features of this fourth embodiment from the first embodiment are as follows. The substrate 119 is heated by a heater 228 while it is running through the heater being introduced by guide rollers 109 in order to improve scratch hardness thereof. It is effective to support the substrate 119 with numerous supporters 230 which are fixed on rotating belts 229, 229. The belts 229, 229 are rotated like belt conveyers. The supporters 230, 230 . . . grasp peripheries of the substrate 119 and give tension widthwise of the substrate 119, during transferring of the substrate in the heater 228, for the purpose of preventing above-mentioned thermal transformation. The tension is produced by slight expansion of distance between the belts 229 after clipping the substrate. Clips as shown in FIG. 9 or needle like pins for piercing the both edges of the substrate can be also used as supporters 230.

Figure 10:
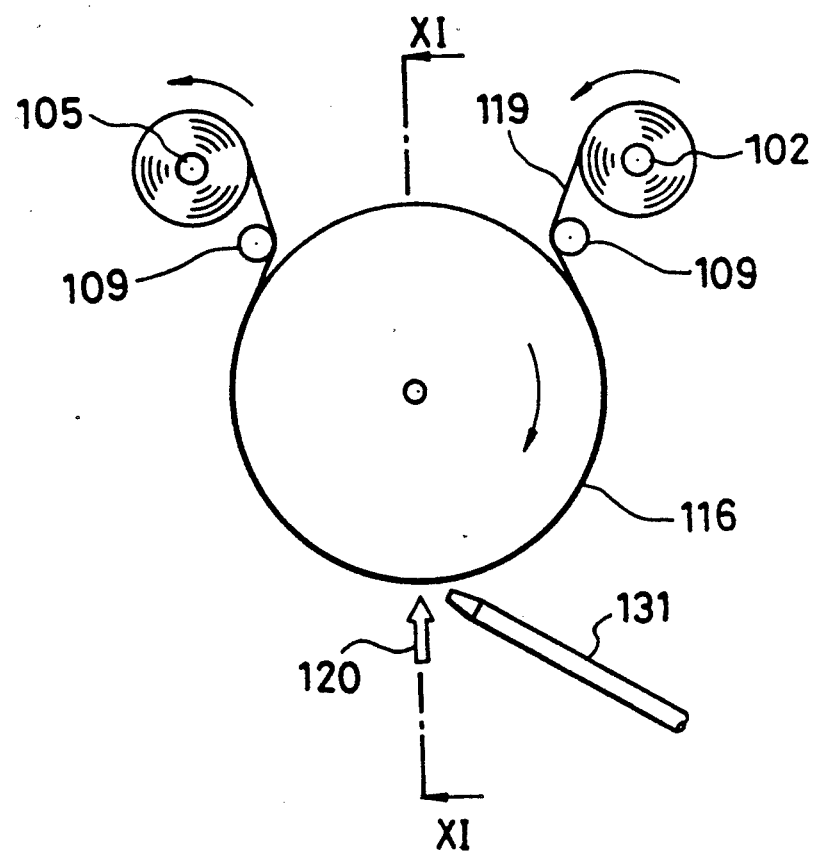
FIG. 10 is a side view of a fourth embodiment of a heating apparatus utilizing a laser embodying the present invention.
Figure 11:
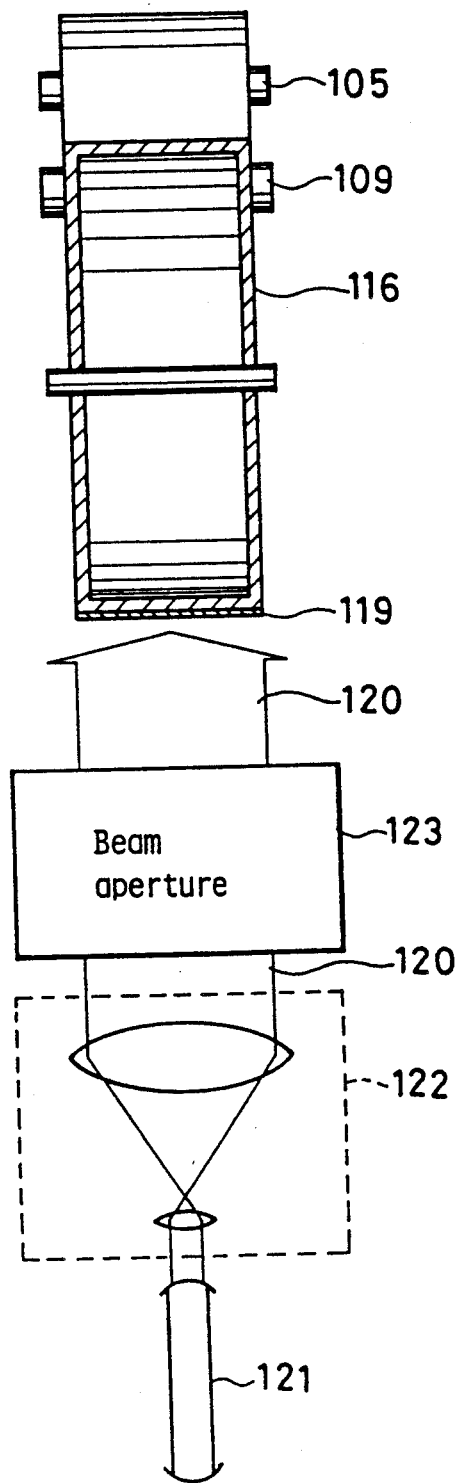
FIG. 11 is a cross-sectional view taken on line XI—XI of FIG. 10.
Figure 12:
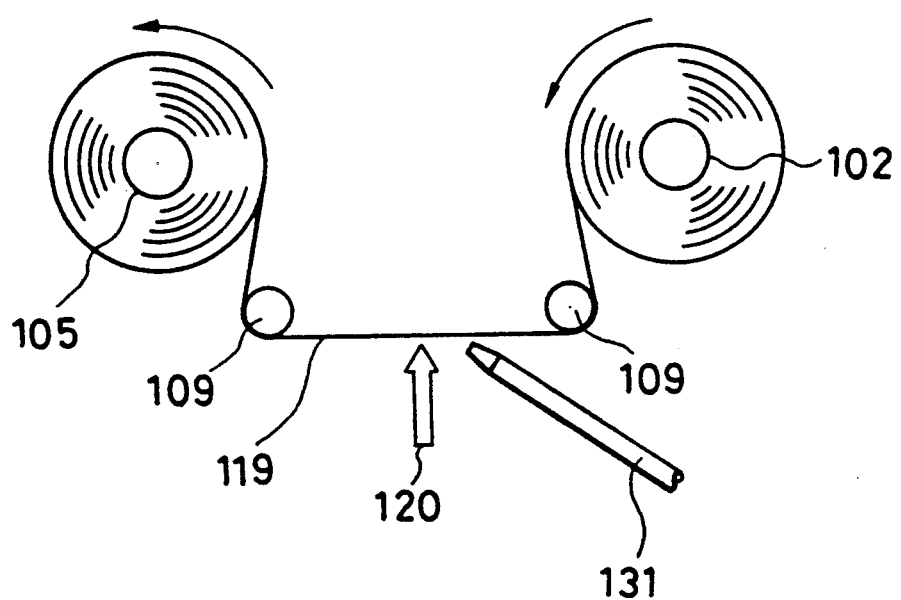
FIG. 12 is a side view of a fifth embodiment of a heating apparatus utilizing a laser embodying the present invention.
Figure 13:
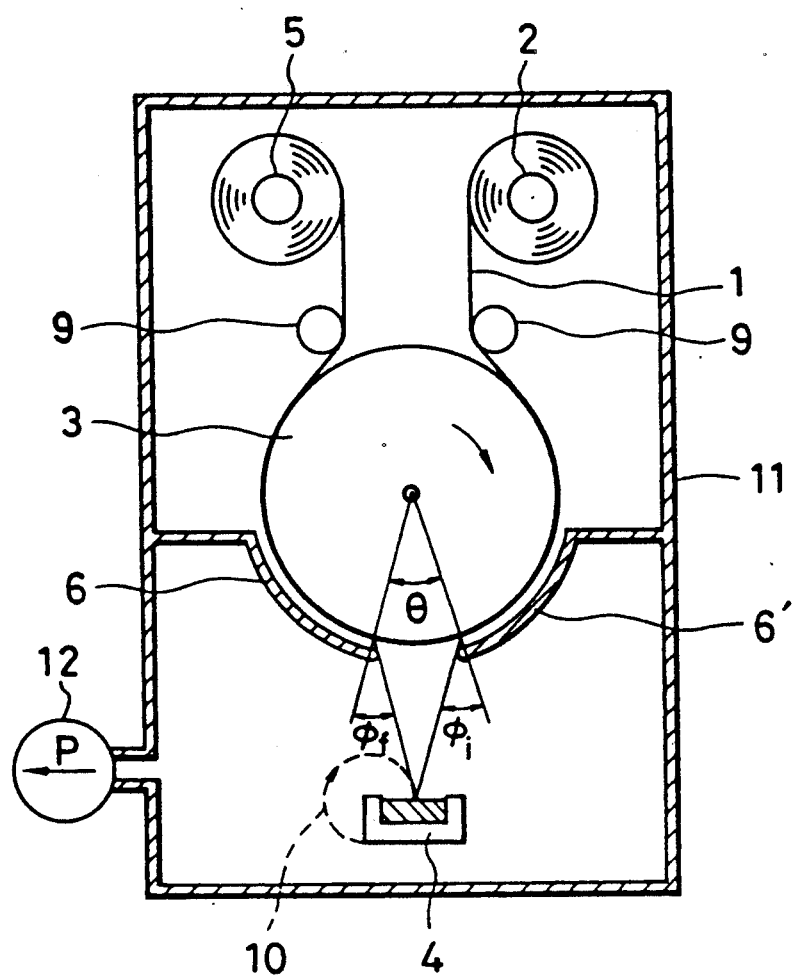
FIG. 13 is a side view of a conventional web coater type vacuum deposition apparatus.

Further, apparatuses as a fifth and sixth embodiment utilizing lasers as their heating means as shown in FIGS. 10 and 12 are also advantageous for heating. In this example, the metal magnetic film is selectively and rapidly heated. That is, heat load on the substrate is reduced. Corresponding parts and components to the first embodiment are shown by the same numerals and marks, and the description thereon made in the first embodiment similarly apply. Differences and features of the fifth and the sixth embodiments from the first embodiment are as follows. A laser source having high output is necessary for the purpose of oxidizing the surface of the metal magnetic film on the substrate running at high speed by radiation. Now, an excimer laser (about 500 w), a YAG(yttrium aluminum garnet) laser (about 1 kw) and a $CO_2$ gas laser (about 1 kw) are suitable for a practical use as a high output laser. All of these lasers are usable in the present invention. FIG. 11 shows an example utilizing a $CO_2$ gas laser, wherein laser radiation source 121 radiates laser beam 120, which is expanded to a desirable width by a beam expander 122. The expanded laser beam is shaped in desired form by a beam aperture apparatus 123 comprising a slit and/or cylindrical lens. The preferable shaped laser 120 is irradiated onto the metal magnetic film surface formed on the substrate. The beam expander 122 and the beam aperture apparatus 123 which are set after the laser source are usable similarly in other laser sources. As the matter of course, it is possible to use a way of scanning as the method of applying the laser beam. It is necessary to adjust the output of the laser, since absorption rate of the metal magnetic film varies depending on wavelength of the laser. The running speed of the substrate have an effect upon the above-mentioned adjusting too. In FIG. 10 the difference from FIG. 12 is that the laser is radiated onto the deposited substrate 119 while the substrate 119 is running on the circumference of a cylindrical roller 116 for supporting the substrate. Thus the cylindrical roller 116 is advantageous for preventing the thermal deformation of the substrate by laser radiation. It is possible to combine heating of the cylindrical roller 116 and/or with blowing of oxygen onto the substrate by a nozzle 131 in FIG. 10 with the above-mentioned laser heating, in order to accelerate forming oxidized laser surface.

It is found that there is a relation among conditions of laser irradiation, thickness of the oxidized layer and period of still durability, using the substrate formed 250 nm thick Co-Cr layer thereon having 450 emu/cc as a saturation magnetization. The thickness of the oxidized layer is varied by changing the running speed of the deposited substrate in irradiation. The thickness of the oxidized layer is estimated by the data of depthwise oxygen distribution of AES. The still durability is defined as a period from start of use of the recording medium to occurrence of considerable decreases due to scratch caused on the surface of the film measured in pause (still) mode. A $CO_2$ gas laser is used under conditions of: 5 mm length; 200 mm width; and 400 w constant output. Table 1 shows the relation among, the running speed of the substrate, the thickness of the oxidized layer and the period of the still durability.

TABLE 1

| Running speed of the substrate (m/mim) | Thickness of the oxidized layer (nm) | Still durability (min) |
| --- | --- | --- |
| 10 | 26 | >60 |
| 20 | 14 | >60 |
| 25 | 10 | >60 |
| 30 | 5 | 13 |
| 40 | 3 | *1 |

*1: Extreme deterioration is shown immediately after starting

Table 1 shows that there is the necessity for the oxide layer to be more than 10 nm thick. Particularly for 3 nm or 5 nm, the still durabilities are extreme low. Such a thin oxidized layer of about 3nm thickness is usually found on conventional Co-Cr thin film which is left alone in atmosphere. Concerning the relation between the running speed and the thickness of the oxide film, it is confirmed that as the running speed of the substrate increases the oxidation is diminished. When the speed of the substrate decreases, the oxidation is accelerated, and in some cases undesirable thermal damage of the substrate and metal magnetic thin layer thereon are caused. Thus sufficient care is necessary to determine the running speed of the substrate under irradiation by the laser.

The above mentioned embodiments are elucidated with respect to only the polyimide film having a Co-Cr layer thereon. Either with respect to a Co-Ni-Cr layer or another high polymer substrate, similar effects as mentioned above are observed.

The above-mentioned embodiments are elucidated under the conditions of an initial incident angle $\phi_i$ which is 40' or less than 40'. But it is efficient to utilize an initial incident angle $\phi_1$ which is larger than 40' in the above mentioned embodiments for improving productivity, as far as the deterioration of magnetic characteristic due to large initial incident angle is acceptable for some use.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What claimed is:

1. In a method for manufacturing perpendicular magnetic recording medium wherein a magnetic layer containing Co and Cr as main contents or Co, Cr and Ni as main contents on a running substrate of polymer film
    the improvement that
    incident angle of vaporized atom to form said magnetic layer has 30' or larger at the side of ending of vacuum deposition and
    said magnetic layer is heated in an oxygen-containing atmosphere.

2. Method in accordance with claim 1, wherein said magnetic layer is heated in the atmosphere or in a gas having an oxygen partial pressure of substantially the same as or higher than that of air.

3. Method in accordance with claim 1 or 2, wherein said magnetic layer is heated by contacting on a cylindrical roller.

4. Method in accordance with claim 3, wherein at least one ends of entering or leaving said cylindrical roller, said substrate is cooled down.

5. Method in accordance with claim 4, wherein said substrate is cooled down by flow of cool air.

6. Method in accordance with claim 4, wherein said substrate is cooled by at least one nipping roller.

7. Method in accordance with claim 4, wherein the temperature of said substrate at an area of getting in touch with said cylindrical roller is less than 200° C.

8. Method in accordance with claim 4, wherein the temperature of said substrate at an area of departing from said cylindrical roller is less than 250° C.

9. Method in accordance with claim 1 or 2, wherein said magnetic layer is heated by a laser.

10. Method in accordance with claim 1 or 2, wherein said magnetic layer is heated by a heater and said substrate is transferred being supported to receive tension crosswise of the transferring direction.

11. Method in accordance with claim 1 or 2, wherein said magnetic layer is heated under oxygen flow.

* * * * *

UNITED STATES PATENT AND TRADEMARK OFFICE
CERTIFICATE OF CORRECTION

PATENT NO. : 4,999,220

DATED : March 12, 1991

INVENTOR(S) : HONDA, et al.

It is certified that error appears in the above-identified patent and that said Letters Patent is hereby corrected as shown below:

On the Title Page:

[75]  Inventors:  Kazuyoshi Honda, Takatsuki;
Ryuji Sugita; Kiyokazu Tohma,
both of Hirakata;
Yasuhiro Kawawake, Takatsuki;
Yoshiki Murakami, Osaka,
all of Japan Signed and Sealed this Twenty-ninth Day of September, 1992

*Attest:*

DOUGLAS B. COMER

*Attesting Officer*   *Acting Commissioner of Patents and Trademarks*